United States Patent [19]

Iqbal

[11] Patent Number: 5,010,917
[45] Date of Patent: Apr. 30, 1991

[54] FLUID CONTROL VALVE

[75] Inventor: Muhammad Iqbal, Sheboygan, Wis.

[73] Assignee: Kohler Co., Kohler, Wis.

[21] Appl. No.: 502,929

[22] Filed: Apr. 2, 1990

[51] Int. Cl.⁵ .......................................... F16K 27/06
[52] U.S. Cl. ............................ 137/454.6; 137/625.32;
251/288
[58] Field of Search ............. 137/454.2, 454.6, 625.32;
251/288

[56] References Cited

U.S. PATENT DOCUMENTS

| 3,107,546 | 10/1963 | Rowland | 251/285 X |
| 3,698,418 | 10/1972 | Schmitt | 251/288 X |
| 3,743,243 | 7/1973 | Scaramucci | 251/288 |
| 3,780,758 | 12/1973 | DeVries | 137/454.6 |
| 3,788,601 | 1/1974 | Schmitt | 137/454.6 X |
| 3,831,621 | 8/1974 | Anthony et al. | 251/288 X |
| 4,105,043 | 8/1978 | Nicolayczik . | |
| 4,319,735 | 3/1982 | Moen | 251/288 X |
| 4,425,935 | 1/1984 | Gonzalez | 137/454.6 X |
| 4,557,288 | 12/1985 | Botnick | 137/454.5 X |
| 4,821,765 | 4/1989 | Iqbal | 251/288 X |

Primary Examiner—Stephen M. Hepperle
Attorney, Agent, or Firm—Quarles & Brady

[57] ABSTRACT

A fluid control valve is disclosed. Preferably, a plastic body member of the cartridge is provided. A valve stem is provided that includes a pair of metal stop elements extending radially outward. A metal stop table is mounted around the stem to limit rotational movement of the valve stem through contact with the stop elements. The legs have radially-projecting extensions which are designed to fit in recesses within the valve housing to prevent rotation of the stop table. Excess rotational forces applied to the valve stem after the cartridge reaches a fully open or closed position are translated through the stop table and directly into the valve housing without stressing the plastic body member.

15 Claims, 4 Drawing Sheets

FLUID CONTROL VALVE

FIELD OF THE INVENTION

This invention relates to a valve cartridge useful to control the flow of fluid through a faucet or the like. More particularly, the present invention relates to a valve adapted to limit breakage caused by excess rotational forces.

BACKGROUND OF THE INVENTION

Cartridge valves for faucets or the like that have plastic and/or ceramic components are well known. See e.g., U.S. Pat. Nos. 3,831,621; and 4,821,765. Production of such valves with mostly metal valve components is time consuming and expensive. Thus, some of these valves incorporate valve components made of a plastic material. This has involved a trade-off, though, because plastic valve components are often more susceptible to breakage and wear.

One cartridge valve that incorporates both metal and plastic components is shown in U.S. Pat. No. 3,780,758. There, a metal stem has a radially extended integral arm, and a plastic valve housing has a pair of spaced abutments. Rotational movement of the valve stem is halted when the metal arm encounters the plastic abutments. This design has several drawbacks. For instance, frequent interaction of the metal component with the generally less rigid plastic component may wear the plastic piece and lead to inexact operation of the valve. Also, if the rotational forces applied to the plastic component become too great, the plastic component may break.

It can therefore be seen that a need exists for an improved cartridge valve that does not generally translate rotational forces between metal and plastic components.

SUMMARY OF THE INVENTION

The present invention is designed to provide a structure which directly translates rotational forces from the faucet handle to the surrounding valve housing when the handle is attempted to be rotated past the open or closed position. In general, the cartridge fluid control valve is useful in a valve housing, where the valve housing has a fluid inlet and a fluid outlet. A body member of the cartridge has an inlet port open to the fluid inlet. A stationary valve element is positioned within the body member, and has at least one aperture therethrough. A movable valve element is rotatably mounted within the body member adjacent the stationary valve element. The rotational position of the movable valve element relative to the stationary valve element regulates the fluid flow through the cartridge. A valve stem is linked to the movable valve element in the body to rotate therewith. A stop element extends radially outward from and rotates with the valve stem. The cartridge also has a stop table that is mounted within the body member. The stop table has a leg which limits rotational movement of the stop element. The stop table has a radially-projecting extension which extends radially past the cartridge to engage the housing so as to limit rotation of the stop table relative to the housing.

Thus, the cartridge is operable to regulate fluid flow through the valve in response to rotational movement of the valve stem. Rotation of the valve stem and the movable valve element determines the amount of fluid flow through the aperture of the stationary valve element. Rotation is halted when the stop element, rotating with the valve stem, contacts the leg of the stop table. This may occur when the cartridge reaches either the fully open or the closed position. Because the stop table includes a radially-projecting extension which extends radially past the cartridge to engage the housing, excess rotational forces are translated directly through the stop table into the valve housing. Excess rotational forces result whenever the valve stem is attempted to be rotated past the open or closed position and the stop element is in contact with the leg of the stop table.

In another aspect, the cartridge fluid control valve is formed with two stop elements extending radially outward from and rotating with the valve stem. The stop elements interact with two legs of the stop table. In this preferred design, the stop elements and legs are positioned so that each stop element contacts a leg when the cartridge is fully open or closed. This prevents rotation of the valve stem from generating forces tending to move the valve stem laterally toward the stop table.

In another aspect of the invention, the stop table has at least one outwardly-directed tapered flange. The body member has at least one catch member with an inwardly-directed tapered edge. The catch member is movable by the tapered flange to cause the catch member to resiliently retain the stop table within the body member. This aspect provides a convenient design to assemble the cartridge into a single piece. This eliminates the need for connections, such as threaded connections, which generally increase the manufacturing cost of the cartridge assembly.

In another aspect of the invention, the stop table is formed of a metal material and the body member is formed of a plastic material. This allows the cartridge to be formed with a minimum number of specially-machined metal components which tend to increase production costs. The cartridge will withstand rotational forces applied to the faucet handle because the forces are translated through the metal stop table. The radially-projecting extension on the stop table conveys excess forces applied to the handle into the valve housing without stressing the plastic body member.

In another aspect of the invention, a cartridge fluid control valve is useful in a valve housing, where the housing has a fluid inlet and a fluid outlet. A body member has an inlet port open to the fluid inlet and a side window open to the fluid outlet. A stationary valve element is positioned within the body member, and a movable valve element is rotatably mounted within the body member adjacent the stationary valve element. The rotational position of the movable valve element relative to the stationary valve element regulates the fluid flow through the cartridge. A valve stem is rotatably mounted within the body member and includes a means for engaging the movably valve element. In this way, the valve stem and the movable valve element rotate together. The valve stem has a stop element that extends radially outward from the perimeter of the valve stem. A stop table is mounted within the body member. The stop table has a leg which limits rotational movement of the valve stem through contact with the stop element of the valve stem. The stop table has a radially-projecting extension which extends radially past the cartridge to engage the housing and limit rotation of the stop table relative to the housing. This aspect provides a cartridge which translates excess rotational forces into the surrounding valve housing while employing a minimum number of components. The valve stem is formed with a stop element which contacts the leg of the stop table to limit rotation of the valve stem. Excess rotational forces are translated into the valve housing through the radially-projecting extension of the stop table.

Therefore, it is an object of the invention to provide a cartridge fluid control valve for use in a valve housing where excess rotational forces applied to the valve stem will be translated into the valve housing without stressing the main body of the cartridge.

It is another object of the invention to provide a cartridge having a minimum number of specially-machined metal components in order to reduce the manufacturing cost of the cartridge.

It is another object of the invention to provide a cartridge where excess rotational forces applied to the valve stem are translated into the valve housing exclusively through metal components, which thereby minimizes the wear and breakage of plastic cartridge components.

It is another object of the invention to provide a cartridge employing a convenient means of maintaining the components of the cartridge in a single unit.

It is still another object of the invention to provide a cartridge which is inexpensive to manufacture yet relatively simple to assemble and use in combination with a valve housing.

The foregoing and other objects and advantages of the present invention will appear from the following description. In the description, reference will be made to the accompanying drawings which illustrate a preferred embodiment of the present invention. This embodiment does not represent the full scope of the invention. Reference should therefore be made to the claims herein for interpreting the full scope of the invention.

DETAILED DESCRIPTION OF THE PREFERRED EMBODIMENT

Figure 1:
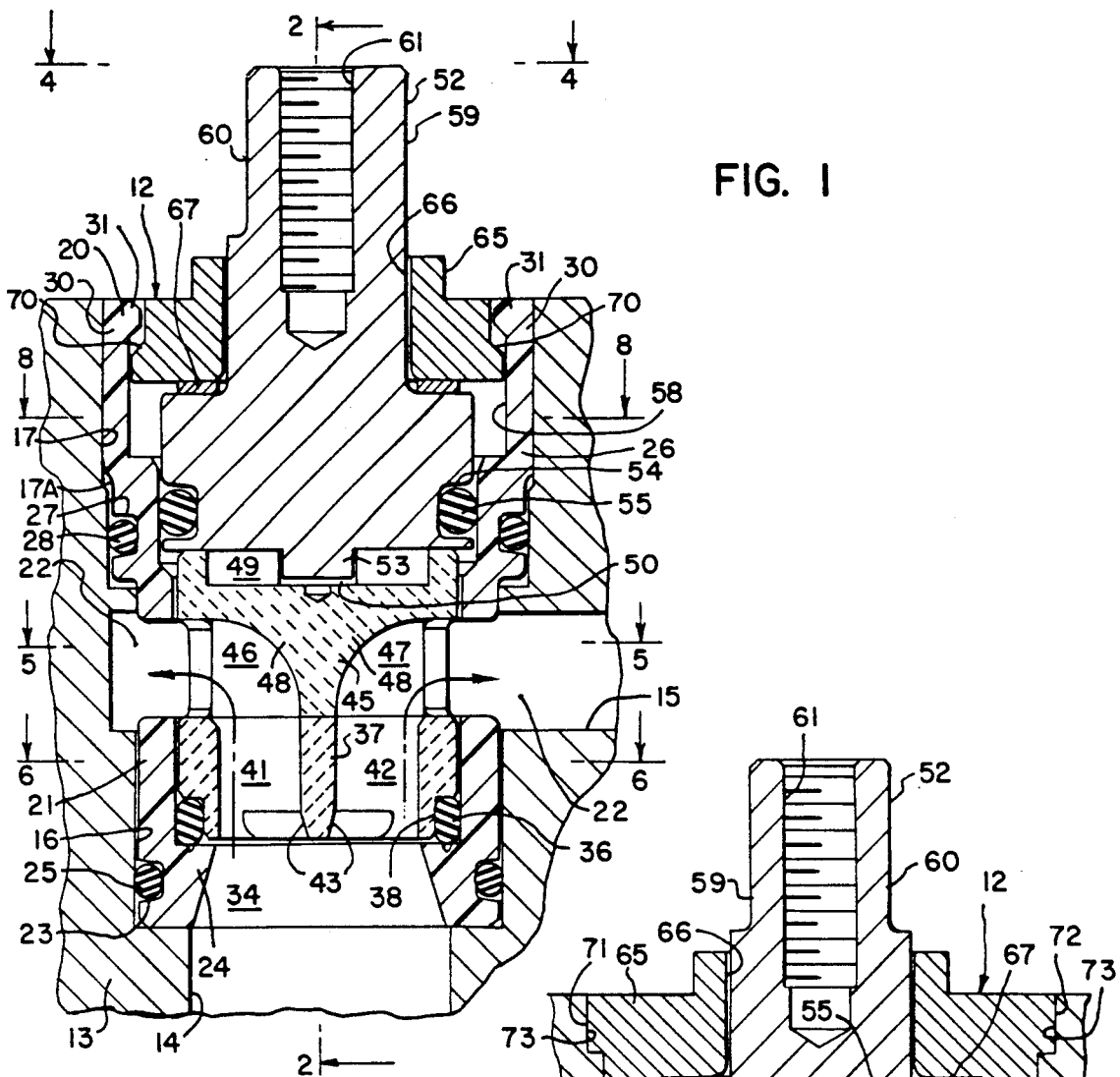
FIG. 1 is a view in section of a cartridge valve assembly embodying the present invention, the cartridge assembly being mounted in a valve housing and being aligned in an open position.
Figure 2:
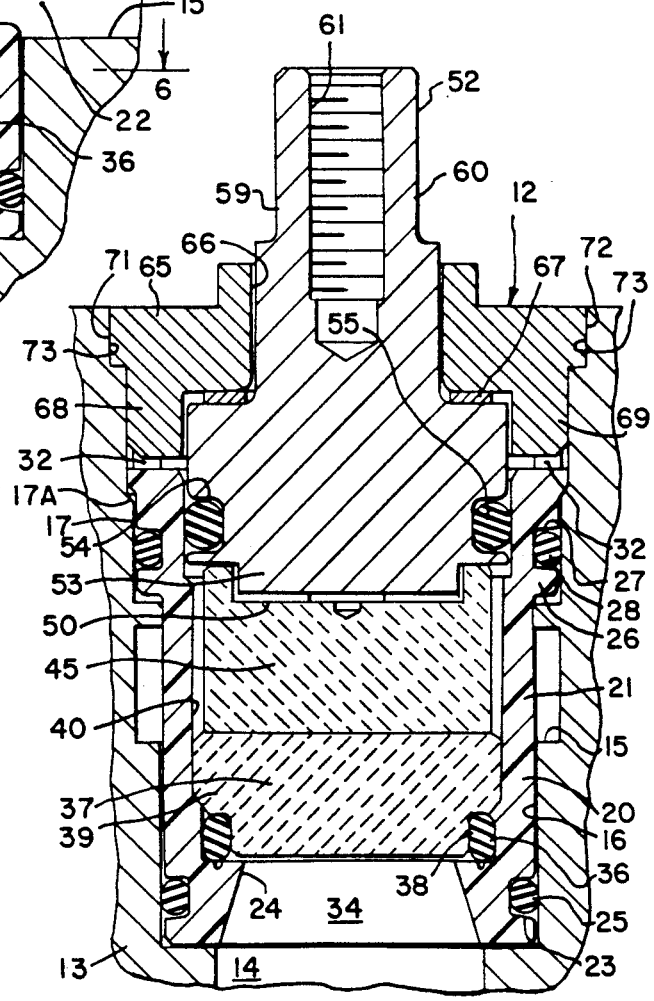
FIG. 2 is a view in section of the cartridge assembly taken along line 2—2 of FIG. 1.

Referring to FIGS. 1 and 2, a cartridge fluid control valve assembly 12 embodying the present invention is shown mounted within a valve housing 13. The housing 13 has a standard design to permit the flow of fluid, including a bottom water inlet 14 and a side water outlet 15. A lower bore 16 and an upper bore 17 (including step surface 17A) are formed in the valve housing 13 to permit insertion of a body member 20 of the cartridge assembly 12. Fluid may flow through the cartridge assembly 12 as illustrated by the direction arrows in FIG. 1. Fluid enters through the bottom water inlet 14, is channeled through the body 20, and exits through the side water outlet 15. The cartridge assembly 12 is maintained within the housing 13 by a nut (not shown) that threadably engages the housing.

The body member 20 is preferably formed of a plastic material and has a cylindrical portion 21 which is appropriately sized to fit within the lower bore 16 of the housing 13. The cylindrical portion 21 has a pair of ports or windows 22 (FIG. 1) positioned opposite each other at an axial position in line with the side water outlet 15. The bottom of the cylindrical portion 21 includes an exterior groove 23 and an annular inward lip 24. An O-ring 25 resides within the groove 23 to provide a seal between the body member 20 and the valve housing 13. This seal prevents fluid communication between the bottom water inlet 14 and the side water outlet 15 other than through the cartridge assembly 12. An inlet port 34, defined within the annular inward lip 24, is open to the bottom water inlet 14 to permit fluid flow into the cylindrical portion 21.

Above the cylindrical portion 21, the body member 20 is formed with a crown 26 that is appropriately sized to fit within the upper bore 17 of the housing 13. The crown 26 has a groove 27 that receives an O-ring 28 to form another seal between the body member 20 and the housing 13. This seal prevents fluid from leaving the valve housing 13 other than through the side water outlet 15. As shown best in FIGS. 1 and 3, the crown 26 has a pair of catch members 30 with inwardly-directed, tapered edges 31. The catch members 30 are positioned opposite one another and are relatively resilient because the body member 20 is formed of a plastic material. Similarly, a pair of apertures 32 (FIG. 3) are positioned opposite one another in side walls of the crown 26. Four upwardly-projecting wall segments 33 of the side walls separate the catch members 30 and the apertures 32.

Figure 5:
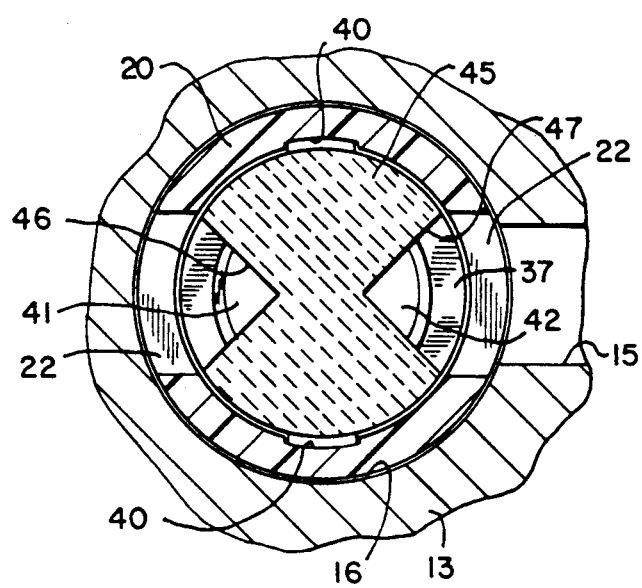
FIG. 5 is a view in section taken along line 5—5 of FIG. 1.
Figure 6:
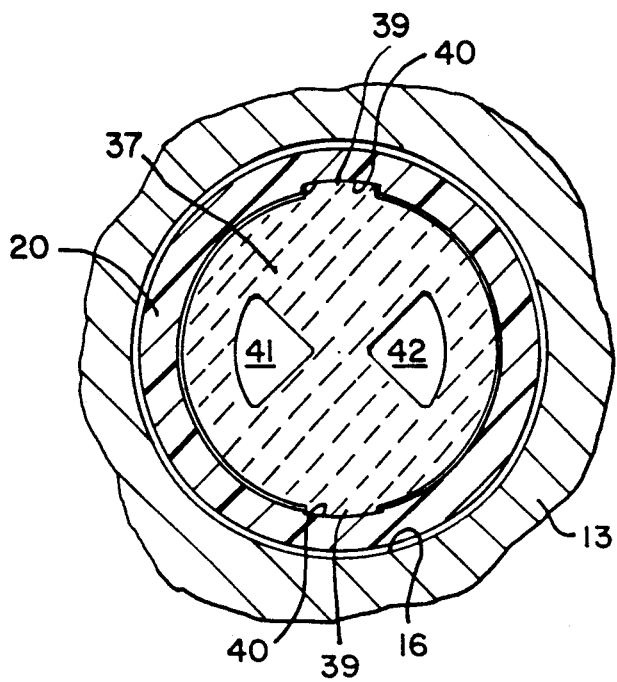
FIG. 6 is a view in section taken along line 6—6 of FIG. 1.

The cartridge assembly 12 is constructed by inserting an annular gasket 36 inside the cylindrical portion 21 of the body member 20. A stationary valve element 37, preferably formed of a ceramic material, has a reduced diameter portion 38 that rests and seals against the gasket 36. The stationary valve element 37 is prevented from rotating relative to the body member 20 due to exterior projections 39 (FIGS. 2, 3 and 6) which engage internal slots 40 (FIGS. 2, 5 and 6) formed in the body member 20. A pair of wedge-shaped openings 41 and 42 extend longitudinally through the stationary valve element 37. Adjacent the reduced diameter portion 38, the edges of the openings 41 and 42 are tapered as shown at reference numeral 43 (FIG. 1).

A movable valve element 45, also preferably formed of a ceramic material, is positioned on the stationary valve element 37. A water resistant lubricant such as grease (not shown) may be applied on the mating surfaces of the stationary and movable valve elements 37 and 45 so that the elements may easily rotate relative to one another. The movable valve element 45 has two arc-like relief portions 46 and 47 which extend completely through the side and bottom of the movable valve element 45. The relief portions 46 and 47 correspond in the terms of the size of their arc to the size of the wedge-shaped openings 41 and 42. When the movable valve element 45 is inserted into the body member 20, the relief portions 46 and 47 are aligned with the side water outlet 15. Each relief portion is formed with a curved surface 48 to provide non-turbulent fluid flow. The top surface of the movable valve element 45 is formed with a pair of slots 49 and 50 which form an X-shaped pattern (best shown in FIG. 3).

A valve stem 52 preferably formed of a metal material is positioned in the crown portion 26 of the body member 20. A bar-like drive foot 53 of the valve stem 52 is appropriately sized to snugly reside within either slot 49 or 50 of the movable valve element 45. In FIGS. 1, 2 and 4-11, the cartridge assembly 12 is illustrated with the drive foot 53 positioned in slot 50. The valve stem 52 has an external groove 54 to receive an O-ring 55. The O-ring 55 provides a seal between the valve stem 52 and the body member 20 while still allowing the valve stem to rotate freely about its longitudinal axis. A pair of metal stop elements 56 and 57 (FIG. 3) project radially outward from opposite sides of the periphery of the valve stem 52. In the cartridge assembly 12, the stop elements 56 and 57 are positioned in an enlarged portion 58 of the crown 26. As described below, rotational movement of the valve stem 52 is limited due to the stop elements 56 and 57. The valve stem 52 also has a neck 59 with a contoured area 60 and a threaded central opening 61. A handle (not shown) is positioned over the contoured area 60 and attached via the central opening 61 so that rotation of the handle causes the valve stem 52 to rotate therewith.

Figure 3:
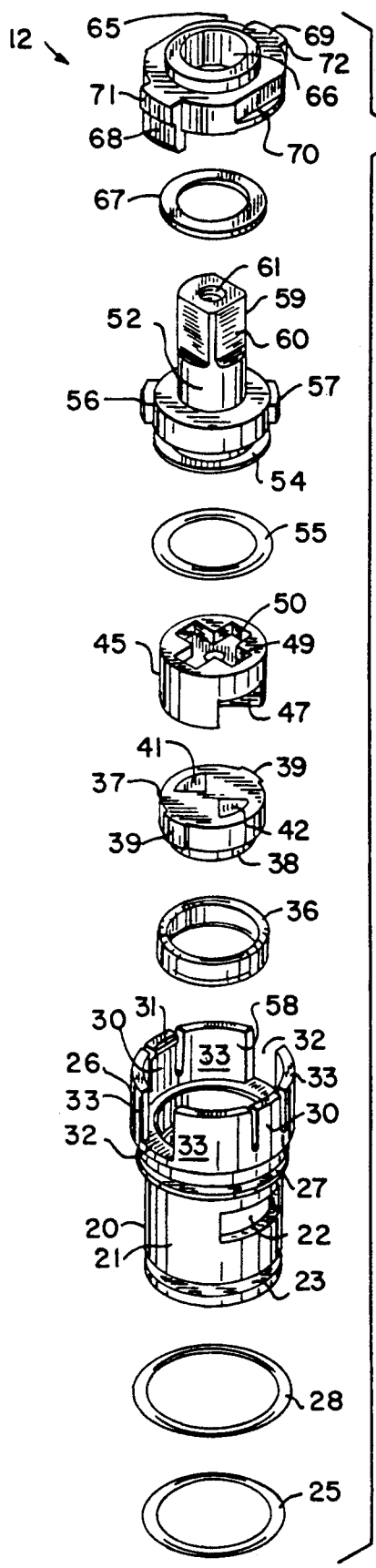
FIG. 3 is an exploded perspective view of the cartridge assembly parts shown in FIGS. 1 and 2.

A stop table 65 has a central opening 66 which permits the stop table to be positioned about the neck 59 of the valve stem 52. The stop table 65 is preferably formed of a metal material. A washer 67 is inserted between the stop table 65 and the valve stem 52 to facilitate relative rotation between the parts. The stop table 65 has two radially and axially extending legs 68 and 69 (FIGS. 2 and 3) which are appropriately sized to fit loosely within the apertures 32 of the crown 26. The stop table 65 is partially cut on its periphery to form tapered flanges 70 (FIGS. 1 and 3). The flanges 70 align with the catch members 30 when the legs 68 and 69 are inserted into the apertures 32 of the crown 26. When the stop table 65 is lightly pressed onto the valve stem 52 with the washer 67 therebetween as suggested by FIG. 3, the resilient catch members 30 bow outward slightly and snap back to hold the stop table 65 in place. The snap fit is aided by the both the edges 31 and the flanges 70 being tapered. The stop table 65 also includes radially-outward jutting extensions 71 and 72. As shown best in FIGS. 2 and 4, the extensions 71 and 72 extend radially outward beyond the widest portion of the body member 20. The extensions 71 and 72 fit into recesses 73 formed in the valve housing 13 to limit or prevent rotational movement of the stop table 65 relative to the valve housing.

Figure 7:
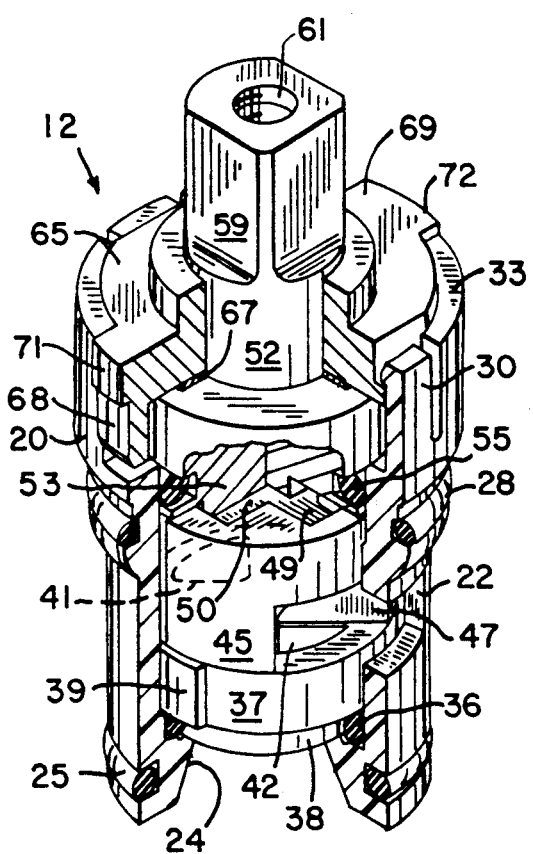
FIG. 7 is a fragmented perspective view of the cartridge assembly in the open position.

The cartridge assembly 12 is operative to regulate the flow of fluid between the bottom water inlet 14 and the side water outlet 15 in response to rotational movement of the faucet handle. This is advantageously accomplished according to the present invention without transmitting the rotary force from the handle to the plastic body member 20. The cartridge assembly 12 at the same time achieves manufacturing efficiencies by minimizing the number of machined metal parts. The full range of movement of the cartridge assembly 12 is shown in FIGS. 7, 9 and 10 where the cartridge is in open, partially open, and closed positions, respectively.

Viewing the open position of the cartridge assembly 12 (FIGS. 1, 2, 4-8), it can be seen that the stationary and movable valve elements 37 and 45 are positioned to permit fluid flow through the cartridge. Specifically, the arc-like relief portion 47 of the movable valve element 45 is positioned directly over the wedge-shaped opening 42 of the stationary valve element 37. The opposite relief portion 46 is over and open to the opposite wedge-shaped opening 41 (shown in broken lines in FIG. 7). In this way, fluid from the bottom water inlet 14 may flow through the wedge-shaped openings 41 and 42 into the relief portions 46 and 47. The curved surfaces 48 of the relief portions 46 and 47 channel the fluid laterally through the window 22 of the body member 20 and out through the side water outlet 15. The curved surfaces 48 and the taper 43 of the wedge-shaped openings 41 and 42 provide a gentle fluid flow with a minimum amount of noise.

Figure 4:
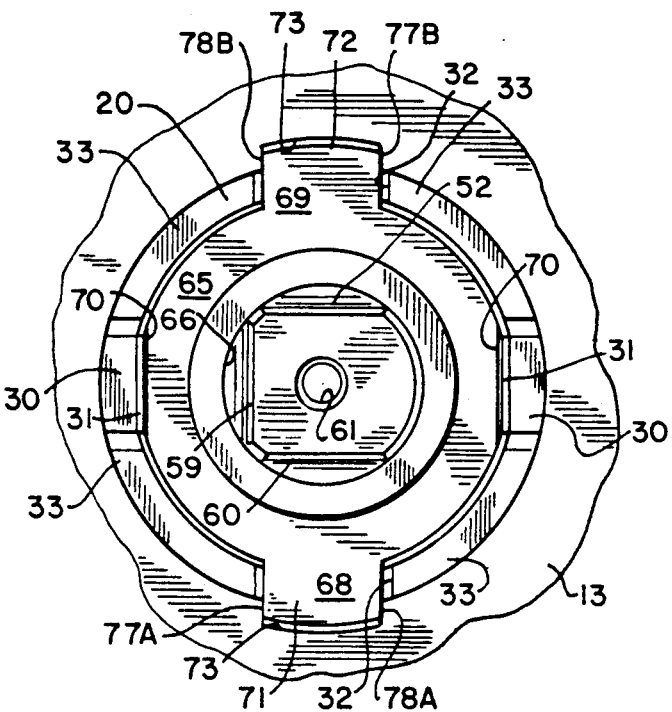
FIG. 4 is a top plan view of the cartridge assembly, taken along line 4—4 of FIG. 1.
Figure 8:
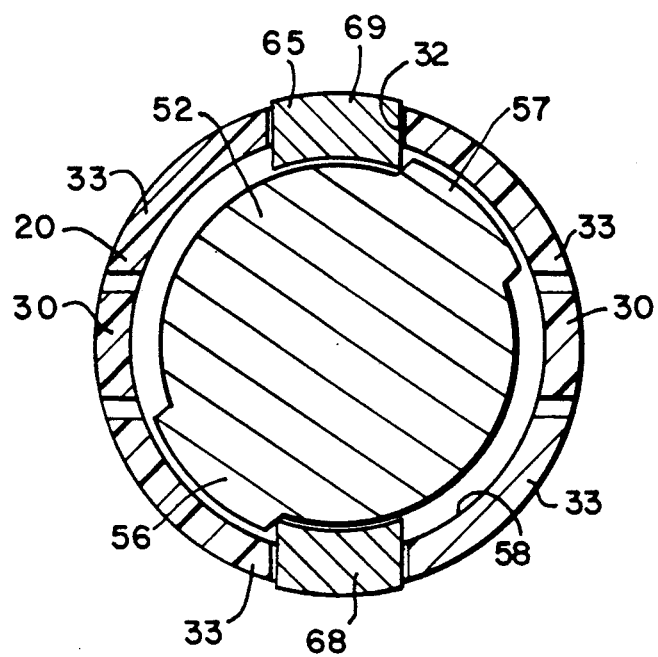
FIG. 8 is a view in section taken along line 8—8 of FIG. 1, the view not showing the valve housing and the cartridge assembly being aligned in the open position.

FIG. 8 shows the relationship of the valve stem 52 and the stop table 65 when the cartridge assembly 12 is in the open position. The legs 68 and 69 of the stop table 65 fit loosely into the apertures 32 of the body member 20. The valve stem 52 in the fully open position is rotated so that the stop elements 56 and 57 are in contact with the legs 68 and 69 of the stop table 65. This contact prevents further counter-clockwise rotation of the handle or the valve stem 52. Note that any rotational force applied to the handle and thus the valve stem 52 is not translated to the plastic body member 20. Referring to FIG. 4, the extensions 71 and 72 on the legs 68 and 69 are positioned within the recesses 73 in the housing 13. Thus, further counter-clockwise rotation of the valve stem 52 will transmit the rotational force to the stop table 65 (due to contact between stop elements 56 and 57 and legs 68 and 69) and thereby to the housing 13 (due to contact between extensions 71 and 72 and housing 13). The counter-clockwise rotational force is transmitted at surfaces 78A and 78B into the valve housing 13.

Figure 9:
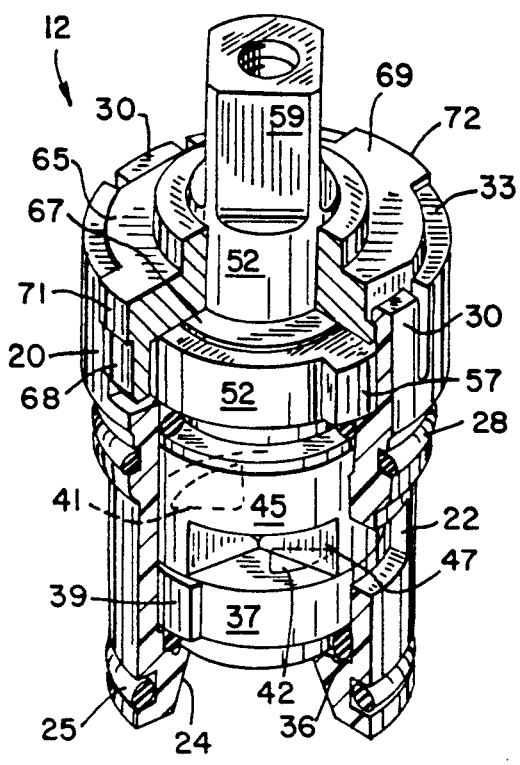
FIG. 9 is a fragmented perspective view of the cartridge assembly in a partially open position.
Figure 10:
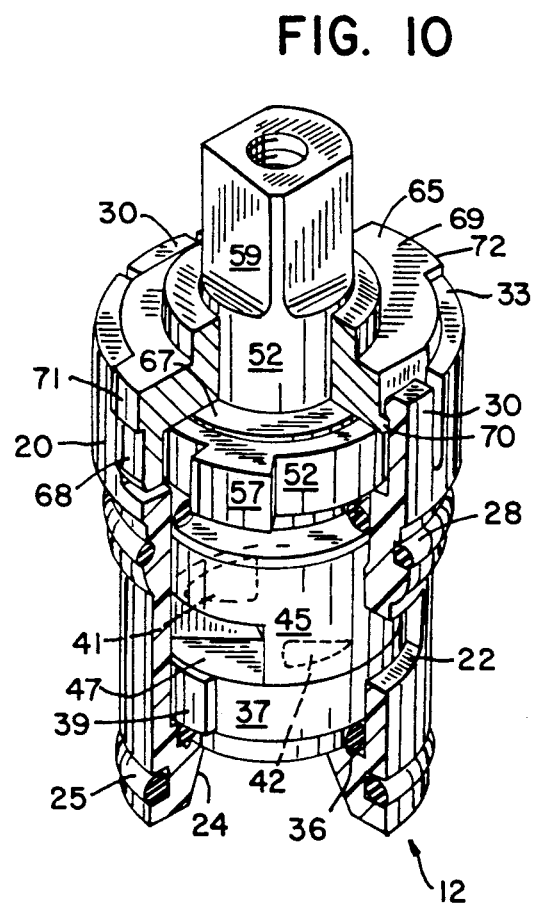
FIG. 10 is a fragmented perspective view of the cartridge assembly in a closed position.

Clockwise rotation of the handle will cause the cartridge assembly 12 to move toward the partially open position illustrated in FIG. 9. In this position, the stop table 65 does not interfere with rotation (clockwise or counterclockwise) of the valve stem 52. Because the drive foot 53 of the valve stem 52 is inserted into the slot 50 of the movable valve element 45, the movable valve element 45 rotates with the handle and the valve stem 52. As the movable valve element 45 rotates into the position shown in FIG. 9, a portion of the wedge-shaped openings 41 and 42 of the stationary valve element 37 are blocked by the movable valve element 45. This results in an intermediate amount of fluid flow through the cartridge assembly 12.

Figure 11:
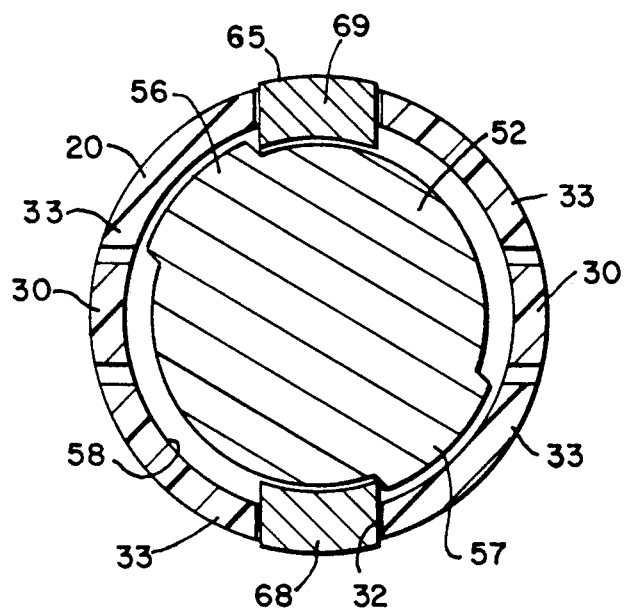
FIG. 11 is a view in section similar to FIG. 8, but showing the cartridge assembly aligned in the closed position.

Further clockwise rotation of the handle will cause the cartridge assembly 12 to assume the closed position shown in FIG. 10. The handle may be rotated until the stop elements 56 and 57 of the valve stem 52 come into contact with the legs 69 and 68 of the stop table 65. In this position, the relief portions 46 and 47 of the movable valve element 45 are not open to the wedge-shaped openings 41 and 42 of the stationary valve element 37, so that no fluid may flow through the cartridge. As illustrated in FIG. 11, when the valve stem 52 is rotated to the closed position, further clockwise rotational force is transmitted from the valve stem 52 to the metal stop table 65 due to contact between the stop elements 56 and 57 and the legs 69 and 68. The rotational force is in turn transmitted from the stop table 65 to the valve housing 13 due to contact between the extensions 71 and 72 of the stop table 65 and the housing 13 (see FIG. 4). The clockwise rotational force is transmitted from the stop table 65 to the valve housing 13 due to contact at surfaces 77A and 77B.

It can therefore be seen that rotational forces applied to the faucet handle may be translated through an interconnection of the metal components (valve stem 52 and stop table 65) of the cartridge assembly 12 and absorbed by the valve housing 13. The translation of rotational forces to the housing 13 occurs whenever the handle is attempted to by rotated past either the open or the closed position of the cartridge assembly 12. In these instances, the plastic body member 20 is not stressed and does not absorb the rotational forces which may tend to wear or break the plastic. Rather, the rotational forces are translated to the housing 13 through metal-to-metal contact between the valve stem 52 and the stop table 65, without passing through the body member 20. This efficient translation of forces allows the cartridge assembly 12 to be constructed of a minimal amount of metal components, which results in substantial production savings.

As described above and illustrated in FIGS. 7, 9 and 10, the cartridge assembly 12 is closed by rotating the handle in the clockwise direction. This orientation may be reversed by removing the drive foot 53 from slot 50 and inserting the drive foot in slot 49. The cartridge assembly 12 can then be closed by rotating the handle in the counter-clockwise direction. This reverse mode of operation is useful to distinguish a hot water line from a cold water line.

The foregoing detailed description has been for the purpose of illustration. Thus, a number of modifications and changes may be made without departing from the spirit and scope of the present invention. In several instances, components of the cartridge assembly 12 could be combined. For example, the valve stem 52 could be integrally formed with the movable valve element 45. Such a modification would eliminate the ability to convert between left-handed and right-handed operation, but this could then be accomplished by two different valve stem/valve element designs. Similarly, the stationary valve element 37 could be integrally formed with the body member 20, and may simply be an opening in the body member 20, the flow of fluid through which would be controlled by the position of the movable valve element 45.

It would also be possible to form two components from a single member. For instance, the stop elements 56 and 57 could be formed on a separate ring member having a splined internal bore. The ring member could engage external splines on a valve stem so that the ring member rotates with the valve stem.

Other modifications will be apparent to those skilled in the art. It will also be clear that the cartridge assembly would function in a similar manner with either a single stop element 56 or 57 or a single leg 68 or 69, although pairs of oppositely-positioned stop elements and legs are preferred. Therefore, the invention should not be limited by the specific embodiments described, but only by the claims.

I claim:

1. A cartridge fluid control valve for use in a valve housing, the housing having a fluid inlet and a fluid outlet, the cartridge comprising:
   a body member having:
      an inlet port open to the fluid inlet; and
      a side wall with an aperture therethrough;
   a stationary valve element positioned within the body member, the stationary valve element having at least one aperture therethrough;
   a movable valve element rotatably mounted within the body member adjacent the stationary valve element, the rotational position of the movable valve element relative to the stationary valve element regulating fluid flow through the cartridge;
   a valve stem linked to the movable valve element in the body to rotate therewith;
   a stop element extending radially outward from and rotatable with the valve stem; and
   a stop table which is mounted within the body member, the stop table having:
      a leg which limits rotational movement of the stop element; and
      a radially-projecting extension which extends radially past the cartridge and through the aperture in the side wall of the body member to engage the housing so as to limit rotation of the stop table relative to the housing.

2. The cartridge fluid control valve of claim 1, wherein:
   the leg is positioned in the aperture of the side wall; and
   the radially-projecting extension extends radially outward of the body member adjacent the leg.

3. The cartridge fluid control valve of claim 1, wherein two stop elements extend radially outward from the perimeter of the valve stem and interact with two legs of the stop table.

4. The cartridge fluid control valve of claim 1, wherein the stop table is metal and the body member is plastic.

5. A cartridge fluid control valve for use in a valve housing, the housing having a fluid inlet and a fluid outlet, the cartridge comprising:
   a body member having an inlet port open to the fluid inlet;
   a stationary valve element positioned within the body member, the stationary valve element having at least one aperture therethrough;
   a movable valve element rotatably mounted within the body member adjacent the stationary valve element, the rotational position of the movable valve element relative to the stationary valve element regulating fluid flow through the cartridge;
   a valve stem linked to the movable valve element in the body to rotate therewith;
   a stop element extending radially outward from and rotatable with the valve stem; and
   a stop table which is mounted within the body member, the stop table having a leg which limits rotational movement of the stop element, and a radially-projecting extension which extends radially past the cartridge to engage the housing so as to limit rotation of the stop table relative to the housing;
   wherein:

the stop table has at least one outwardly-directed tapered flange; and the body member has at least one catch member with an inwardly-directed tapered edge, the catch member movable by the tapered flange to cause the catch member to resiliently retain the stop table within the body member.

6. The cartridge fluid control valve of claim 5, wherein:

the stop table has a central opening; and the valve stem has a neck extending through the central opening.

7. The cartridge fluid control valve of claim 5, wherein:

the catch member is formed in an upper crown portion of the body member;

the upper crown portion includes an aperture; and the leg is positioned in the aperture.

8. The cartridge fluid control valve of claim 7, wherein the radially-projecting extension extends radially outward from the leg.

9. A cartridge fluid control valve for use in a valve housing, the housing having a fluid inlet and a fluid outlet, the cartridge comprising:

a body member having:
 an inlet port open to the fluid inlet;
 a side window open to the fluid outlet; and
 a side wall having an aperture therethrough;

a stationary valve element positioned within the body member;

a movable valve element rotatably mounted within the body member adjacent the stationary valve element, the rotational position of the movable valve element relative to the stationary valve element regulating fluid flow through the cartridge;

a valve stem rotatably mounted within the body member, the valve stem having:

means for engaging the movable valve element so that the valve stem and the movable valve element rotate together; and a stop element extending radially outward from the perimeter of the valve stem; and a stop table which is mounted within the body member, the stop table having:

a leg which limits rotational movement of the valve stem through contact with the stop element; and a radially-projecting extension which extends radially past the cartridge and through the aperture in the side wall of the body member to engage the housing so as to limit rotation of the stop table relative to the housing.

10. A cartridge fluid control valve for use in a valve housing, the housing having a fluid inlet and a fluid outlet, the cartridge comprising:

a body member having:
 an inlet port open to the fluid inlet;
 an outlet port open to the fluid outlet; and
 an upper crown portion with at least one catch member having an inwardly-directed edge;

a stationary valve element positioned within the body member;

a movable valve element rotatably mounted within the body member adjacent the stationary valve element, the rotational position of the movable valve element relative to the stationary valve element regulating fluid flow through the cartridge;

a valve stem rotatably mounted within the body member, the valve stem having:

means for engaging the movable valve element so that the valve stem and the movable valve element rotate together; and a stop element extending radially outward from the perimeter of the valve stem; and a stop table mounted within the body member, the stop table having:

an axially-extending leg which limits rotational movement of the valve stem through contact with the stop element;

an extension projecting radially outward past the cartridge to engage the housing so as to limit rotation of the stop table relative to the housing; and at least one outwardly-directed flange, the inwardly-directed edge of the catch member resiliently positionable adjacent the flange to retain the stop table within the body member.

11. The cartridge fluid control valve of claim 10, wherein the inwardly-directed edge and the outwardly-directed flange are tapered.

12. The cartridge fluid control valve of claim 10, wherein two stop elements extend radially outward from the perimeter of the valve stem.

13. The cartridge fluid control valve of claim 10, wherein the stop table has two axially-extending legs which limit rotational movement of the valve stem through contact with the stop element.

14. The cartridge fluid control valve of claim 13, wherein the stop table has two extensions which engage the housing so as to limit rotation of the stop table relative to the housing, one extension projecting radially outward from each leg.

15. The cartridge fluid control valve of claim 14, wherein the crown portion includes two apertures and the legs are positioned in the apertures.

* * * * *